US008819724B2

(12) United States Patent
Glassman et al.

(10) Patent No.: US 8,819,724 B2
(45) Date of Patent: Aug. 26, 2014

(54) SYSTEMS, METHODS AND APPARATUS FOR PROVIDING SEQUENCES OF MEDIA SEGMENTS AND CORRESPONDING INTERACTIVE DATA ON A CHANNEL IN A MEDIA DISTRIBUTION SYSTEM

(75) Inventors: Nicholas A. Glassman, San Diego, CA (US); Michael K. Bailey, San Diego, CA (US); Michael G. Boyd, Poway, CA (US); Tom O. Mikkelsen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 926 days.

(21) Appl. No.: 11/566,629

(22) Filed: Dec. 4, 2006

(65) Prior Publication Data

US 2008/0134260 A1    Jun. 5, 2008

(51) Int. Cl.
*H04N 7/10*       (2006.01)
*H04N 7/025*      (2006.01)

(52) U.S. Cl.
USPC .......................................................... 725/32

(58) Field of Classification Search
CPC ............ H04N 21/8545; H04N 21/647; H04N 21/2343; H04N 21/2355; H04N 21/64792; H04N 21/4355; H04N 21/26606; H04N 21/47; H04N 21/488; H04N 21/422; H04N 21/4438; H04N 21/45; H04N 21/40
USPC ........... 725/37, 32, 47, 104, 112, 125, 40, 51, 725/110, 135, 136; 348/731; 463/9, 42; 381/56, 61, 104, 106–108
See application file for complete search history.

(56) References Cited

U.S. PATENT DOCUMENTS

| 6,041,056 | A  | * | 3/2000 | Bigham et al. | ........... 370/395.64 |
| 6,230,162 | B1 |   | 5/2001 | Kumar et al. | |
| 6,651,251 | B1 |   | 11/2003 | Shoff et al. | |
| 7,536,705 | B1 | * | 5/2009 | Boucher et al. | ............... 725/112 |
| 8,028,315 | B1 | * | 9/2011 | Barber | ............. 725/47 |
| 2002/0057380 | A1 |   | 5/2002 | Matey | ............. 348/731 |
| 2003/0001880 | A1 | * | 1/2003 | Holtz et al. | ................... 345/716 |
| 2004/0055017 | A1 | * | 3/2004 | Delpuch et al. | ............... 725/110 |
| 2004/0221305 | A1 |   | 11/2004 | Broussard et al. | |
| 2005/0005308 | A1 | * | 1/2005 | Logan et al. | ................... 725/135 |
| 2006/0046807 | A1 | * | 3/2006 | Sanchez | ........................ 463/9 |
| 2006/0291506 | A1 | * | 12/2006 | Cain | ............................. 370/486 |
| 2007/0055989 | A1 | * | 3/2007 | Shanks et al. | ................... 725/37 |
| 2008/0096664 | A1 | * | 4/2008 | Baray et al. | ................... 463/42 |

FOREIGN PATENT DOCUMENTS

| CN | 1310919      | 8/2001  |
| JP | 2002314960 A | 10/2002 |
| JP | 2003304418 A | 10/2003 |
| JP | 2003324698 A | 11/2003 |

(Continued)

OTHER PUBLICATIONS

International Search Report, PCT/US2007/086259, International Searching Authority, European Patent Office, Sep. 4, 2009.

(Continued)

*Primary Examiner* — Nasser Goodarzi
*Assistant Examiner* — An Nguyen
(74) *Attorney, Agent, or Firm* — Fulbright & Jaworski LLP

(57) ABSTRACT

Systems, methods and apparatus for producing, distributing and presenting media presentations include identifying, providing and generating a sequence of media segments from a plurality of media presentations, optionally in combination with associated interactive services, so as to define a media channel.

41 Claims, 8 Drawing Sheets

(56) References Cited

FOREIGN PATENT DOCUMENTS

| JP | 2004080748 A | 3/2004 |
|----|--------------|--------|
| JP | 2006237673 A | 9/2006 |
| WO | WO0010327 A1 | 2/2000 |
| WO | WO0016544 A2 | 3/2000 |

OTHER PUBLICATIONS

Written Opinion, PCT/US2007/086259, International Searching Authority, European Patent Office, Sep. 4, 2009.

International Report on Patentability, PCT/US2007/086259, International Bureau of WIPO, Sep. 24, 2009.

International Preliminary Report on Patentability, PCT/US2007/086259, International Preliminary Examining Authority, European Patent Office, Mar. 11, 2010.

Taiwan Search Report—TW096146132—TIPO—May 30, 2012 (051194TW).

* cited by examiner

SYSTEMS, METHODS AND APPARATUS FOR PROVIDING SEQUENCES OF MEDIA SEGMENTS AND CORRESPONDING INTERACTIVE DATA ON A CHANNEL IN A MEDIA DISTRIBUTION SYSTEM

BACKGROUND

The disclosed aspects relate generally to the operation of media distribution systems, and more particularly, to methods and apparatus for providing and presenting a sequence of media segments, along with interactive data, on a channel in a media distribution system.

Typically, media distribution systems have access to more media than they have available channels and/or bandwidth on which to distribute that media. This conundrum forces media programmers to select some media for distribution, while foregoing distribution of other media. Such distribution of media often leaves customers of the media distribution system less than satisfied, especially if the media in which they are most interested ends up being the media that the media programmers have decided not to distribute.

For example, a media content retailer, such as a cable television service provider and/or a wireless device media service provider, may provide a subscriber with a basic service package having a limited number of channels of distributed media. In order to provide an array of programming options, the content retailer may limit the types of programming offered in the basic service package. For example, given the limited number of channels in the basic service package, the retailer may only offer one channel that delivers live sporting events. The content retailer may have access to a multitude of live sporting events at any one time, however, and the decision to distribute a selected one of these events necessarily alienates those subscribers interested in the other, non-distributed events. Thus, a good portion of the subscribers to the basic programming package may be less than fully satisfied with their user experience.

Continuing with the sporting event example, some media programmers have attempted to address the problem of the supply of events being greater than the available distribution outlets by providing "highlights" of one or more sporting events. Typically "highlights" are unsatisfactory to many subscribers because: (1) the highlights are presented well after the conclusion of the sporting event, when many subscribers already know the outcome, thereby reducing the drama associated with the highlight; and (2) the highlights are generally game-deciding and/or game-ending plays, causing the subscriber to miss the many mini-dramas that unfold throughout a sporting event. Thus, game-deciding highlights, which are presented well after the outcome of an event is known, are not satisfying to many subscribers.

Other unsuccessful attempted solutions to the limited distribution problem include, continuing with the sporting event example, changing torn a first event to a second event, for example, to catch the end of the second event. Again, such complete changing of distributed events alienates subscribers who were following the first event, while dissatisfying subscribers interested in the second event who end up wondering what was missed up to the point of the change over.

In some related aspects, typical media distribution systems provide content targeted for a predetermined demographic of the entire population of users/subscribers. As such, some users/subscribers are likely to be less than satisfied with the content selected by the retailer for delivery.

Additionally, in other related aspects, with the exception of a user changing a channel or subscribing to a given channel or package, typical media distribution systems only provide a one-way service of delivering media content. As such, a user/subscriber has little or no input in determining the media content presented by the content retailer.

Thus, apparatus and methods are desired to provide improved access to multiple media services in a limited media distribution environment.

SUMMARY

In one aspect, a method of distributing a media channel comprises receiving a sequence of selected media segments from at least two of a plurality of media presentations. The method further includes receiving at least one interactive service associated with each of the selected media segments. Also, the method includes generating a channel comprising a base service and an auxiliary service, wherein the base service comprises the sequence of selected media segments from at least two of the plurality of media presentations, and wherein the auxiliary service comprises the at least one interactive service associated with each of the selected media segments. Additionally, the method includes transmitting the channel. In one related aspect, at least one processor is configured to perform the above-stated actions. In another related aspect, a machine-readable medium comprises instructions stored thereon for performing the above-stated actions.

In another aspect, a media distribution system comprises means for receiving a sequence of selected media segments from at least two of a plurality of media presentations. The system further comprises means for receiving at least one interactive service associated with each of the selected media segments. Also, the system comprises means for generating a channel comprising a base service and an auxiliary service, wherein the base service comprises the sequence of selected media segments from at least two of the plurality of media presentations, and wherein the auxiliary service comprises the at least one interactive service associated with each of the selected media segments. Additionally, the system comprises means for transmitting the channel.

In yet another aspect, a method of distributing content comprises transmitting content on a channel to a wireless device, wherein the content comprises a first segment of a first media presentation and an associated interactive service. The method also includes identifying a second segment in a second media presentation, wherein the second media presentation occurring substantially simultaneous to the first media presentation. Additionally, the method includes switching the content on the channel from the first segment to the second segment. In one related aspect, at least one processor is configured to perform the above-stated actions. In another related aspect, a machine-readable medium comprises instructions stored thereon for performing the above-stated actions.

In still another aspect, a media distribution system comprises means for transmitting content on a channel to a wireless device, the content comprising a first segment of a first media presentation and an associated interactive service. The system further comprises means for identifying a second segment in a second media presentation, the second media presentation occurring substantially simultaneous to the first media presentation. Additionally, the system comprises means for switching the content on the channel from the first segment to the second segment.

In yet a further aspect, a media distribution device comprises a communications module operable to receive a sequence of selected media segments from at least two of a plurality of media presentations, wherein the communications module is further operable to receive at least one interactive service associated with the plurality of media presentations. The device further comprises a manager module operable to define a channel comprising a base service and an auxiliary service, wherein the base service comprises the sequence of selected media segments, and wherein the auxiliary service comprises at least one interactive service associated with each of the at least two of the plurality of media presentations in the sequence of selected media segments. Additionally, the device comprises a distribution manager module comprising a distribution mechanism operable to transmit the channel.

In another aspect, a method of presenting media comprises receiving, at a wireless device, a sequence of selected media segments from at least two of a plurality of media presentations. The method includes receiving, at the wireless device, at least one interactive service respectively associated with each of the at least two of the plurality of media presentations. Additionally, the method includes generating, at the wireless device, a presentation of a channel comprising the sequence of selected media segments and the at least one interactive service respectively associated with each of the at least two of the plurality of media presentations corresponding to the selected media segments. In one related aspect, at least one processor is configured to perform the above-stated actions. In another related aspect, a machine-readable medium comprises instructions stored thereon for performing the above-stated actions.

In yet another aspect, a wireless device comprises means for receiving a sequence of selected media segments from at least two of a plurality of media presentations. Also, the device comprises means for receiving at least one interactive service respectively associated with each of the at least two of the plurality of media presentations. Additionally, the device comprises means for generating a presentation of a channel comprising the sequence of selected media segments and the at least one interactive service respectively associated with each of the at least two of the plurality of media presentations corresponding to the selected media segments.

In other aspects, a wireless device comprises a processor, a communications module, an output mechanism and a memory. The communications module is operable to receive a sequence of selected media segments from at least two of a plurality of media presentations. The communications module is further operable to receive at least one interactive service respectively associated with each of the at least two of the plurality of media presentations. Additionally, the memory is in communication with the processor, the output mechanism and the communications module. The memory comprises a media manager module executable by the processor to generate a presentation of a channel on the output mechanism, the channel comprising the sequence of selected media segments and at least one interactive service respectively associated with each of the at least two of the plurality of media presentations corresponding to the selected media segments.

In still further aspects, a method of producing media content comprises receiving a plurality of media presentations occurring in real-time, identifying a sequence of selected media segments from at least two of the plurality of media presentations, providing substantially in real-time commentary corresponding to at least one of the selected media segments, and transmitting substantially in real-time the identification of the sequence of media segments and the associated commentary so as to define a base service of a predetermined media channel. In one related aspect, at least one processor is configured to perform the above-stated actions. In another related aspect, a machine-readable medium comprises instructions stored thereon for performing the above-stated actions.

In another aspect, a media production system comprises means for receiving a plurality of media presentations occurring in real-time, means for identifying a sequence of selected media segments from at least two of the plurality of media presentations, means for providing substantially in real-time commentary corresponding to the selected media segments, and means for transmitting substantially in real-time the identification of the sequence of media segments and the associated commentary so as to define a base service of a predetermined media channel.

In further aspects, a media production system comprises at least one monitoring mechanism operable to track at least one of a plurality of media presentations occurring in real-time and further operable to identify at least one media segment having a moment of interest. The system further comprises a supervisor mechanism operable to identify a sequence of selected media segments identified by the at least one monitoring mechanism, wherein the sequence of selected media segments are associated with at least two of the plurality of media presentations, wherein the supervisor mechanism is further operable to add commentary audio data to at least one of the selected media segments. Additionally, the system comprises a communications module operable to transmit substantially in real-time the identified sequence of selected media segments and the associated commentary audio data so as to define a base service of a predetermined media channel.

DETAILED DESCRIPTION

The following detailed description describes one or more aspects of a content delivery system. The system is especially well suited for use in wireless network environments, but may be used in any type of network environment, including but not limited to one or any combination of a communication network, a public network such as the Internet, a private network such as a virtual private network (VPN), a local area network, a wide area network, a long haul network, and any other type of data or communication network.

Figure 1:
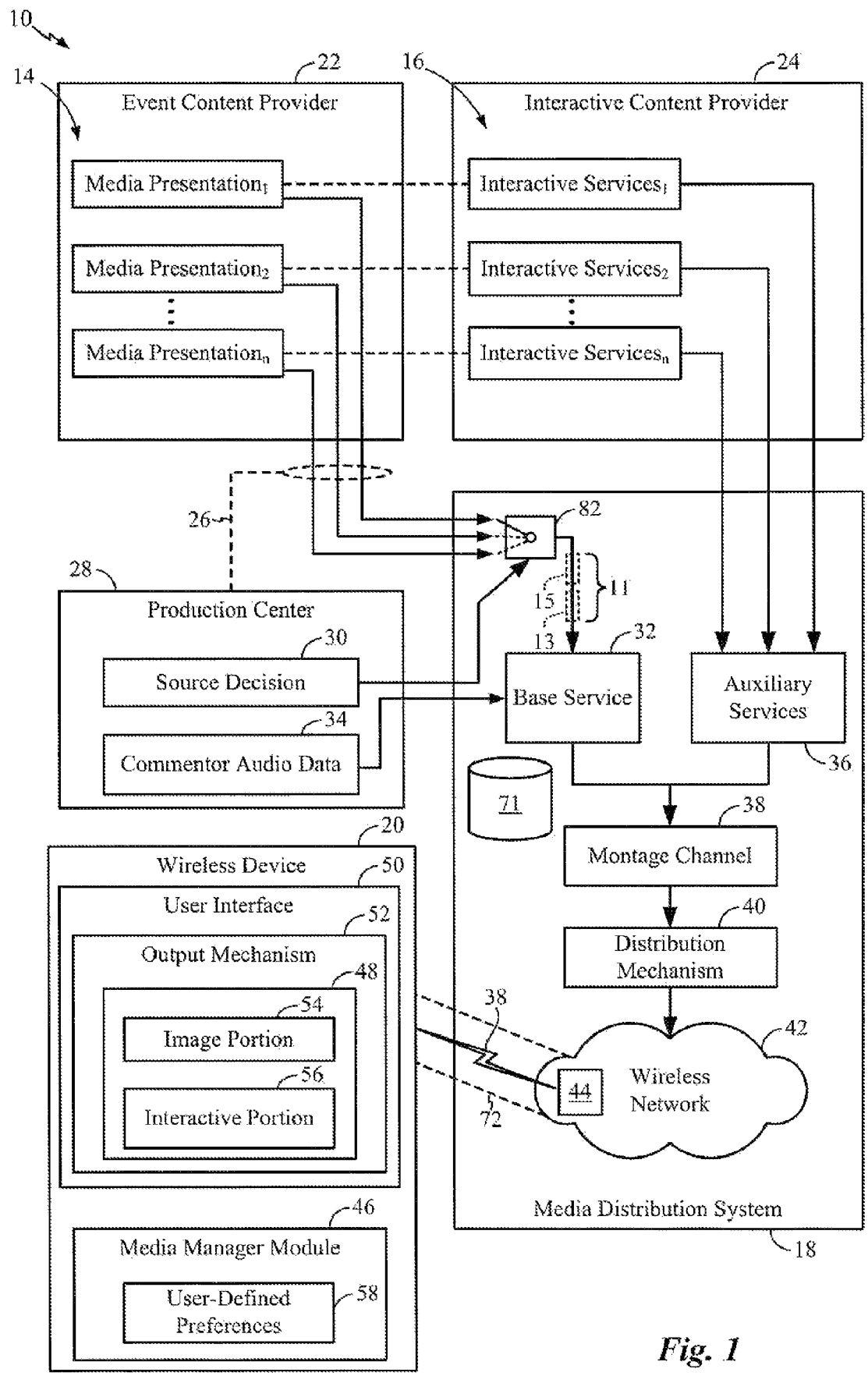
FIG. 1 is a schematic diagram of one aspect of a system for producing, distributing and receiving sequences of media segments and interactive services associated with a plurality of media presentations, such system including a wireless device, a production center and a media distribution system.
Figure 2:
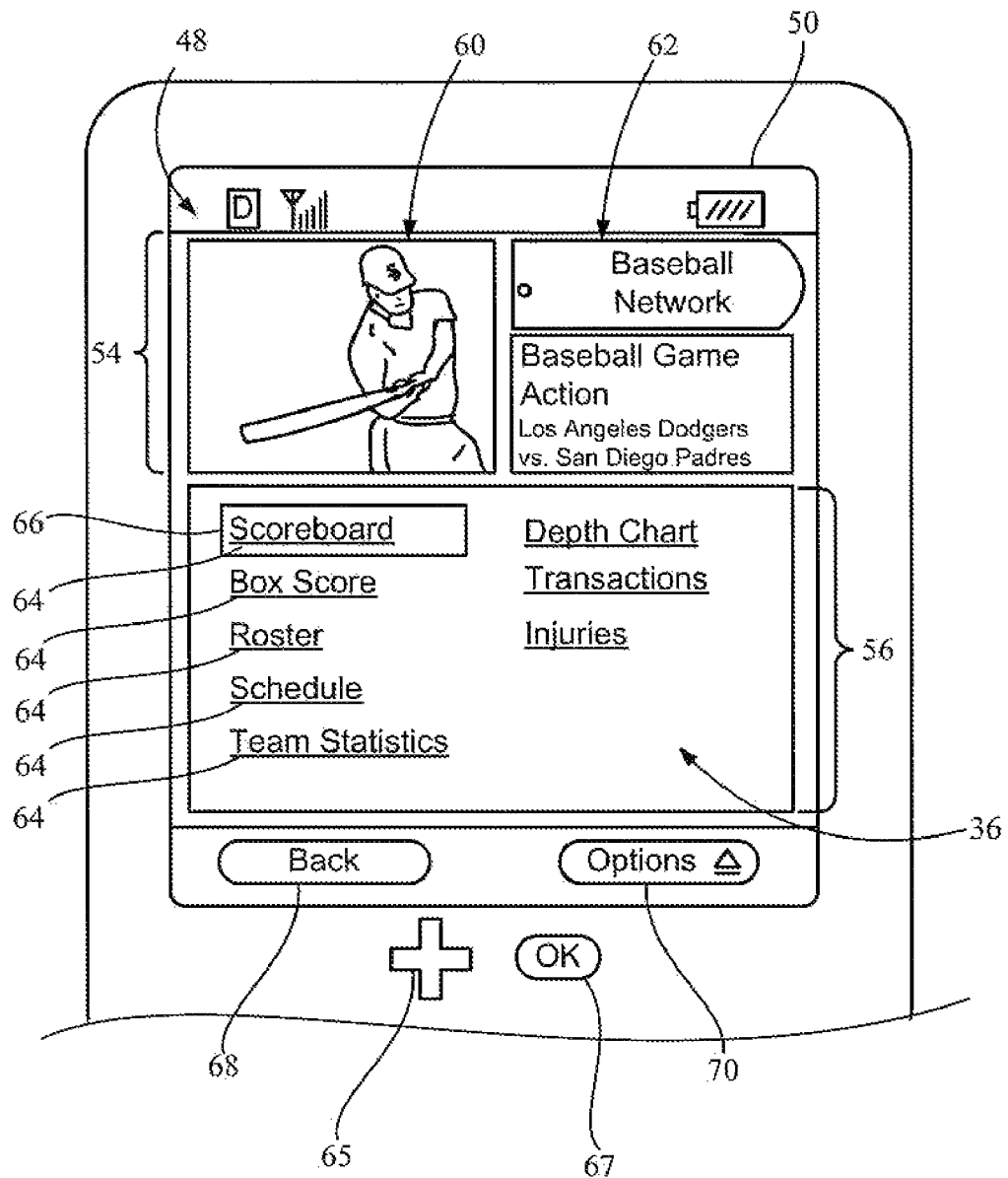
FIG. 2 is a schematic diagram of one aspect of a portion of the wireless device of FIG. 1, including one aspect of a viewing configuration of a user interface.

Referring to FIGS. 1 and 2, in some aspects, a system 10 of media distribution includes apparatus and methods for obtaining, managing and delivering a montage channel 38 comprising a sequence 11 of at least two media segments 13, 15 to a wireless device 20. For example, the sequence 11 of at least two media segments 13, 15 may be selected portions of a corresponding at least two of a plurality of media presentations 14. Further, in some optional aspects, system 10 may provide for delivery to wireless device 20 of at least one of a plurality of interactive services 16 in combination with the sequence 11 of media segments 13, 15. For example, at least one of the plurality of interactive services 16 may comprise a service related to a respective one of the plurality of media presentations 14.

System 10 may further include media distribution system (MDS) 18, which is operable to receive the sequence 11 of at least two media segments 13, 15 and the at least one of the plurality of interactive services 16. For example, in some aspects, MDS 18 may receive the plurality of media presentations 14 from one or more event content providers 22. Through a monitoring mechanism 26, a production center 28 may track each of the plurality of presentations 14 and generate a source decision 30 that indicates to a switch mechanism 82 which one of the plurality of media presentations 14 to use as a base service 32 for montage channel 38. MDS 18 then distributes montage channel 38 to at least one wireless device 20.

In some aspects, for example, the plurality of media presentations 14 may be real-time, simultaneously-occurring events, and production center 28 may sequentially issue numerous source decisions 30 that switch base service 32 between the plurality of media presentations 14. As a result, base service 32 and montage channel 38 may comprise the sequence 11 of at least two media segments 13, 15 selected from portions of the plurality of media presentations 14.

Further, in some optional aspects, production center 28 may add commentator audio data 34 to base service 32. For example, commentator audio data 34 may comprise a "lead-in" audio segment and/or a "closing" audio segment, respectively which may be associated with a transition into and/or a transition out of a given media segment. For example, a "lead-in" may introduce a scenario associated with a media segment about to be presented, while a "closing" may summarize a scenario associated with the presented media segment. In some aspects, commentator audio data 34 may override native audio data associated with the given media presentation.

Additionally, in some aspects, base service 32 may be combined with one or more auxiliary services 36 to define montage channel 38. For example, in some aspects, auxiliary services 36 may include the one of the plurality of interactive services 16 corresponding to the one of the plurality of media presentations 14 being used as base service 32. As such, auxiliary services 36 may comprises a sequence of the plurality of interactive services 16 corresponding to the sequence of at least two media segments 13, 15 selected from the plurality of media presentations 14. In other aspects, auxiliary service 36 may include any combination of the plurality of interactive services 16. Thus, in some aspects, montage channel 38 comprises the sequence 11 of at least two media segments 13, 15, as directed by production center 28, in combination with the corresponding interactive services 16 (e.g. auxiliary services 36) and/or commentator audio data 34.

Further, system 10 and/or media distribution system 18 may include a distribution mechanism 40, such as a signal generator, operable to receive and forward montage channel 38 either directly to wireless device 20 and/or to wireless device 20 via a wireless network 42. For example, wireless network 42 may include a broadcast base station (BBS) 44 operable to transmit montage channel 38 over an air interface to wireless device 20.

In some aspects, wireless device 20 may include a media manager module 46 operable to receive montage channel 38 and render a view 48 of the respective media segment 13, 15 and, optionally, auxiliary service 36, on a user interface 50. Alternatively, or in addition, media manager module 46 may be operable to generate an output, such as audio or vibration, corresponding to the received content of montage channel 38 on an output mechanism 52 on wireless device 20. View 48 may include at least one of an image portion 54, corresponding to base service 32, and an interactive portion 56, corresponding to auxiliary services 36. In some aspects, the configuration of view 48, and in particular the configuration of interactive portion 56, may vary depending on one or more user defined preferences 58. For example, auxiliary services 36 associated with montage channel 38 may include retailer-defined ones of the plurality of interactive services 16, however, a user of wireless device 20 may input user defined preferences 58 to cause presentation of only selected ones of the plurality of interactive services, e.g. those services of most interest to the user. In this case, for example, media manager module 46 may effectively filter auxiliary services 36, based on user defined preferences 58, and only include select interactive services in interactive portion 56.

For example, referring specifically to FIG. 2, image portion 54 of view 48 of montage channel 38 may include a dynamic image portion 60, which corresponds to a given video portion of segment 13, 15 of the selected one of the plurality of media presentations 14 that forms base service 32 at any given time. Further, image portion 54 may optionally include a static image portion 62, such as a graphic and/or text corresponding to at least one of montage channel 38, the selected one of the plurality of presentations 14, and the given one of the sequence 11 of media segments 13, 15. For example, static image portion 62 may include the name of the montage channel and/or the media presentation, and/or an associated description of the content on the channel and/or in the presentation.

Additionally, for example, interactive portion 56 of view 48 may include one or more of the plurality of interactive services 16 (FIG. 1) associated with one or any combination of the selected media presentation 14 (FIG. 1), the given montage channel 38 (FIG. 1), and a given user defined preference 58 (FIG. 1). For example, in some aspects, interactive portion 56 includes auxiliary services 36, which may comprise a predetermined set of the plurality of interactive services 16 (FIG. 1) specified for a given montage channel 38 and/or for a given user defined preference 58. Further, in some aspects, each of the auxiliary services 36 may be represented by a service reference 64. For example, service reference 64 may include a name corresponding to the given service, and may further include a link to information provided by the service. In some aspects, for example, service reference 64 may include, but is not limited to, universal resource locator (URL) information, universal resource identifier (URI) information, an Internet Protocol address, a datacast service, a text file, a graphics file, an audio file, and a video file, an alert such as to identify that some form of user activity service is available, and a link or reference to any additional information.

In one non-limiting example, such as in the case of a baseball game presented as dynamic image portion 60, interactive portion 56 may include references to information relating to the game being presented, such as: a "scoreboard" option that displays the score of the game in the presented media segment and/or the scores of all other ongoing games; a "box score" option which displays a box score and/or descriptive summary of in the presented media segment and/or all other ongoing games, and such box scores may also be obtained through additional interactive links after entering the "scoreboard" option; a "roster" option which displays the roster for one or both teams involved in the presented media segment; a "schedule" option which displays the schedule of one or both teams in the presented media segment; a "team statistics" option which displays performance statistics relating to the team/player's in the presented media segment; a "depth chart" option which displays a current depth chart for one or both of the teams in the presented media segment; a "transactions" option which displays player transactions for one or both of the teams in the presented media segment; and an "injuries" option which displays information relating to injuries of players on one or both of the teams in the media segment. It should be understood that many other interactive services may be provided, as may be determined by one or more of the content provider, the content retailer, a user preference, and the given media segment being presented on the channel.

Figure 3:
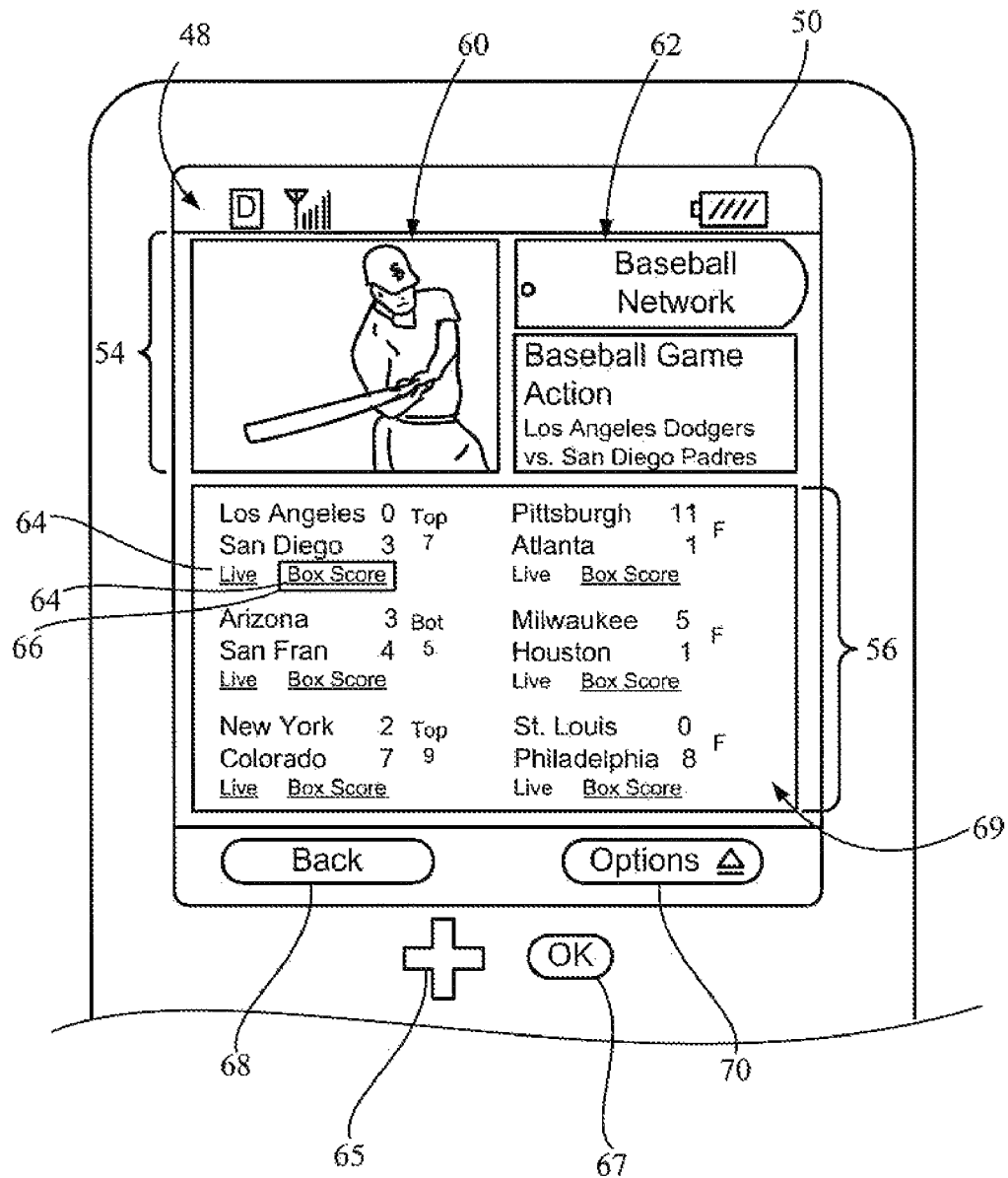
FIG. 3 is a schematic diagram of one aspect of a portion of a wireless device of FIG. 1, including one aspect of a viewing configuration of a user interface based on a selected interactive service.

Referring to FIGS. 2 and 3, for example, upon selection by a user of wireless device 20, such as by using a navigation key 65 to highlight 66 a desired service reference 64 and hitting an "enter" or "ok" key 67, interactive service information 69 is retrieved and presented on at least a portion of user interface 50. For example, the retrieved interactive service information 69 may be presented in the interactive portion 56 of view 48, although the presentation of this information may be configured in any manner by a user of wireless device and/or an operator of the present system. Further, the retrieved interactive service information 69 may include one or more service references 64 to retrieve further additional information.

Further, for example, view 48 may include one or more virtual function buttons 68, 70 that may be highlighted and selected to activate additional functionality. In one non-limiting example, one mode of the view 48 includes "Back" button 68 that returns view 48 or some portion of the view to a previous configuration. In another non limiting example, one mode of the view 48 includes "Options" button 70, which may cause generation of a menu of selectable options. For example, some selectable options may include: a set up a menu to select and/or change the content, orientation, arrangement, and/or size of the various portions of view 48; a user preference menu in order to enter user-defined preferences 58; a media program guide menu in order to display a media program guide of presentations available at various times and on various channels; a secondary audio source selection menu to override the audio associated with the given montage channel 38 with audio from another source; an alternate video source selection menu to display on the user interface 50 different media (effectively changing the channel); and an exit option to and the viewing of the given channel. Further, the selectable options may be based on functionality provided by one or more of the plurality of interactive services 16. Also, it should be noted that the number and the available of functionality associated with virtual function buttons 68, 70 may vary from one channel to the next, from one presentation to the next, and/or from one configuration or mode of view 48 to the next. Additionally, the one more virtual function buttons 68, 70 may have any type of functionality, which may vary depending on the given application.

Referring back to FIG. 1, event content provider 22 may be any entity that provides substantially real-time or live media content, and/or recorded media content, to media distribution system 18. For example, event content provider 22 may be, but is not limited to, one or any combination of a broadcast television media source, a cellular network media source, a multicast network media source, a podcasting source, and any source of any type of media content. As noted above, in some aspects, the majority of the plurality of the media presentations 14 comprise, but are not limited to, substantially real-time or live events. In other aspects, the plurality of media presentations 14 may comprise recorded media, and/or some combination of substantially live and recorded media. Additionally, each one of the plurality of media presentations 14 may include a single, integral media segment or a plurality of interconnected media segments.

Interactive content provider 24 may be any entity that provides interactive content or services. Each of the plurality of interactive services 16 may include a least one, or some combination, of: a text-based service; a graphic-based service; an audio-based service; and, a video-based service. For example, interactive services 16 may include at datacast services, web browsing services, news wire services, etc. further, as discussed above, interactive services 16 may include secondary audio sources and/or alternative video sources, such as a unicast. For example, a user of wireless device 20 may desire to view montage channel 38 while listening to a secondary audio source associated with an event different from the event being presented by montage channel 38. In another example, such as in a case when one of the live events presented by montage channel 38 is available on a unicast, a user of wireless device 20 may be captivated by one of the plurality of media presentations 14 presented on montage channel 38, and may then select an alternate video source option, for example an option corresponding to a unicast, in order to view the entirety of the desired media presentation.

Media distribution system (MDS) 18 comprises any combination of wired and wireless networks, and associated computer devices and servers, which operates to distribute content for delivery to users and/or subscribers. MDS 18 may comprise an optimized broadcast network designed and optimized to deliver high-quality content to selected devices over a plurality of optimized communication channels. For example, such a network may include the MediaFLO™ System available from Qualcomm, Inc. of San Diego, Calif. Further, for example, MDS 18 may comprise one or more memories 71 that store the previously mentioned media, data and records, along with the logic and executable instructions to enable the functionality of MDS 18. Additionally, MDS 18 may include one or any combination of a broadcast system, a multicast system, a unicast system and a datacast system. Further, MDS 18 may be some combination of networks, such as a combination of the aforementioned high quality MediaFLO™ network and a lower quality on-demand video network, such as may be available from a telecommunications network service provider.

Additionally, it should be noted that the sequence 11 of media segments 13, 15 that represent montage channel 38 may be but one component of a media message 72 transmitted by media distribution system 18. For example, media message 72 may include a plurality of channels which each may be associated with one or more packages and/or tiers of media offerings available to a given wireless device 20 from one or more content retailers. Further, for example, media message 72 may include additional data and records that enable wireless device 20 to construct a media presentation guide.

Figure 4:
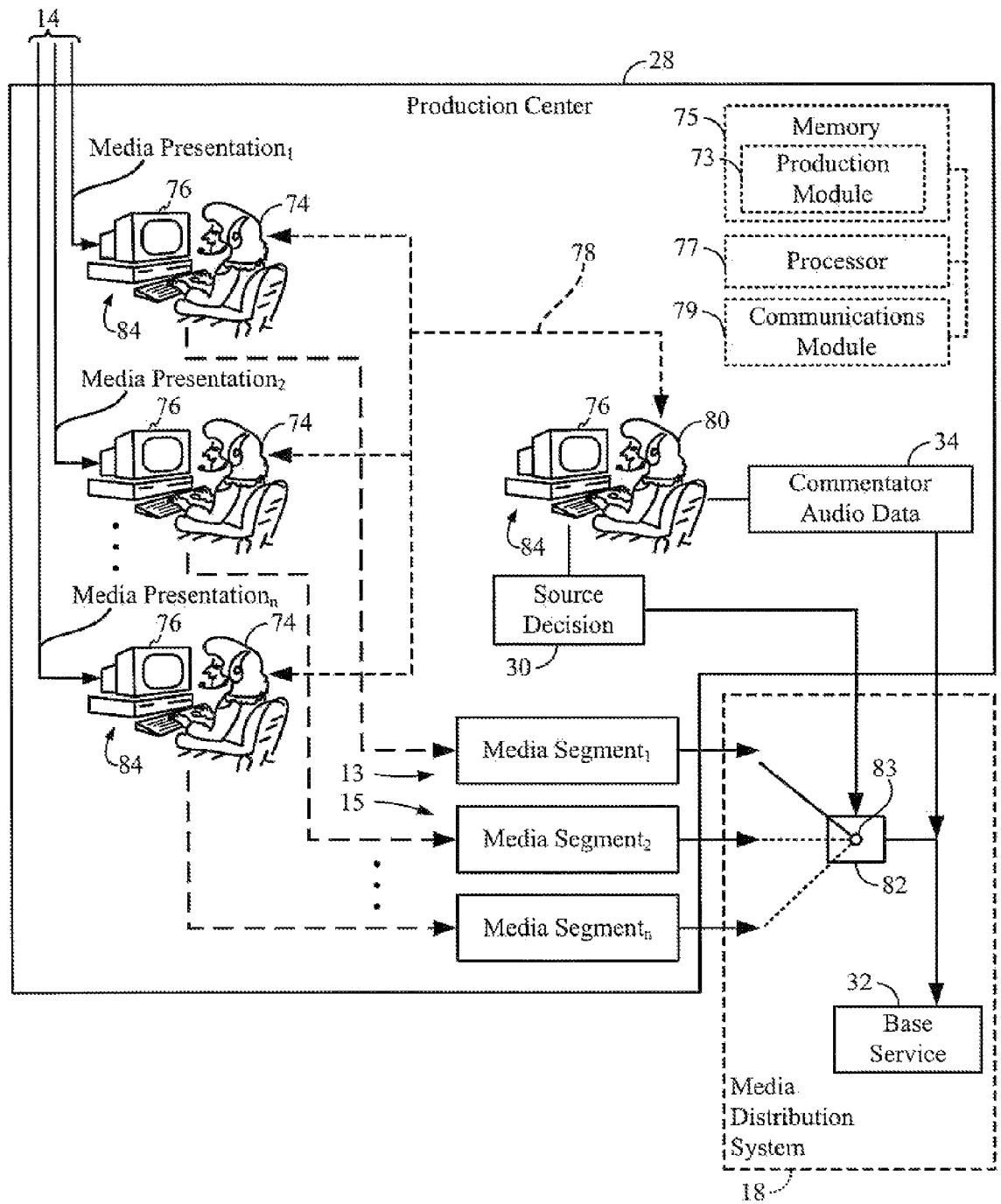
FIG. 4 is a schematic diagram of one aspect of the production center of FIG. 1.

Referring to FIGS. 1 and 4, production center 28 may comprise any system and/or apparatus for monitoring each of the plurality of presentations 14 and identifying given media segments 13, 15, optionally to combine with commentator audio data 34, to form base service 32. In some aspects, for example, one or more monitoring mechanisms 26, such as a human production assistant and/or an automated monitoring device, monitor each of the plurality of presentations 14, in some aspects via a display 76, and identify a moment of interest. Each moment of interest may be represented by a respective media segment, such as segments 13 and 15. Each monitoring mechanism 26 may be in communication 78 with a supervisor mechanism 80, such as a human production supervisor or an automated supervisor mechanism, which is operable to add and/or generate commentator audio data 34. Further, supervisor mechanism 80 is operable to generate source decision 30, which may comprise a signal to activate switching module 82 to change inputs into base service 32, thereby defining a portion of montage channel 38. It should be noted that switching module 82 may be any mechanical and/or electrical switching mechanism at any location upstream of a media signal feed 83 into base service 32. For example, switching module 82 may be located at MDS 18 or may be located at production center 28. Alternatively, source decision 30 may comprise a definition of base service 32 which defines each media segment, such as 13 and 15, selected from at least two of the plurality of media presentations 14. In some related aspects, source decision 30 may further define at least one of a plurality of interactive services 16 associated with each selected media segment.

In some aspects, each monitoring mechanism 26 may include and/or operate a computer device 34 to mark a beginning point and an end point within a given presentation in order to define the respective media segment, such as segments 13 and 15. Further, in some aspects, while each of the plurality of media presentations 14 may comprise live, streaming media, each of the at least two media segments 13, 15 may be recorded, for example at content provider and/or at production center 28, and input into base service 32 after a slight delay. In this scenario, for example, because of the slight delay, the view 48 of montage channel 38 on wireless device 20 may likewise be slightly delayed, and thus view 48 may be a near real-time or substantially real-time presentation of the live event. For example, with respect to delivery of media content, in some aspects time delays ranging from about greater than 0 seconds to about 10 seconds are common, for example due to electric signal path delays and/or to allow for profanity censoring, etc., but the delivered media content may still be considered to be "live" or "real-time" content.

Further, in some aspects, production center 28 may include a production module 73 stored in a memory 75 and operable by a processor 77 to carry out all or some portion of the functionality described herein. For example, production module 73 may include hardware, software, executable instructions and data to carry out the functionality of one or more monitoring mechanisms 26 and/or one or more supervisor mechanisms 80. Further, production center 28 may include a communications module 79 operable to enable communications between production center 28 and external entities, and between the components of production center 28. For example, communications module 79 may be operable to receive each of the plurality of presentations 14 and forward them to a respective monitoring mechanism 26. Similarly, communications module 79 may be operable to forward monitoring communications 78, which identify media segments, to supervisor mechanism 80. Further, communications module 79 may be operable to forward source decision 30, along with media segments 13, 15 and/or commentator audio data 34, to switching module 82. Additionally, in some aspects, memory 75 may store all or some portion of the at least two media segments 13, 15.

Figure 5:
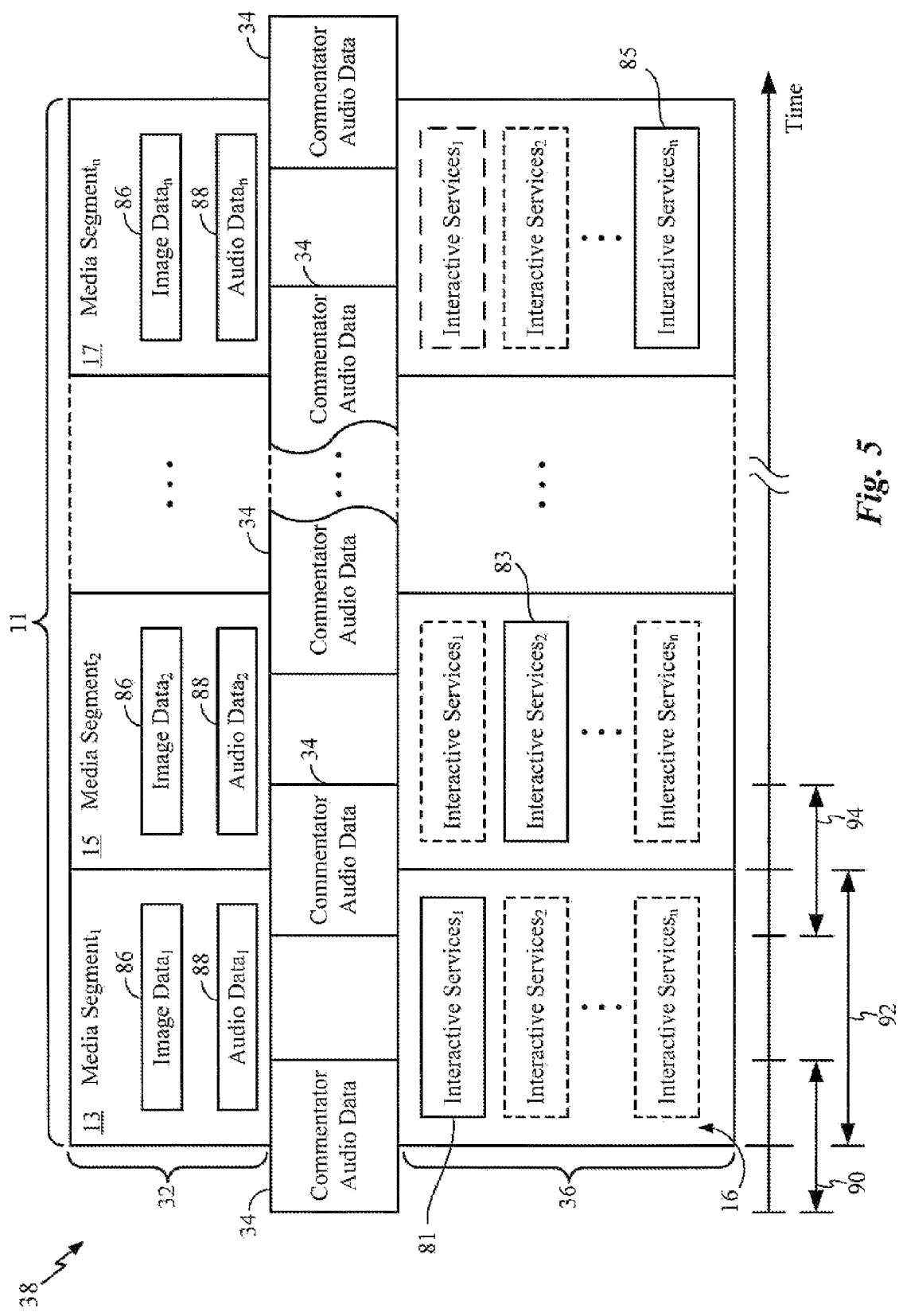
FIG. 5 is a schematic diagram of one aspect of the components of the montage channel of FIG. 1.

Referring to FIG. 5, montage channel 38 comprises the sequence 11 of at least two media segments 13, 15 distributed over time. Further, in some aspects, montage channel 38 may further comprise the corresponding set of interactive services 16 that comprise auxiliary services 36 and/or the corresponding commentator audio data 34. Further, the sequence 11 of at least two media segments 13, 15 may be selected from portions, such as moments of interest, of at least two of the plurality of media presentations 14 (FIG. 1). In some aspects, for example, sequence 11 may comprise a plurality of substantially live segments one after another. In other aspects, for example, sequence 11 may comprise a plurality of substantially live segments interspersed with a plurality of recorded segments. Although illustrated as being consecutive and/or connected, it should be noted that the at least two media segments 13, 15 may be spaced apart over time.

Additionally, for example, in some aspects, each of the at least two media segments 13, 15 may include native image data 86 and native audio data 88 associated with the media presentation from which the respective segment is derived. Further, image data 86 and audio data 88 respectively are represented in image portion 54 of view 48 (FIGS. 1 and 2) and in audio generated by output mechanism 52. Also, in some aspects, at least a portion of the plurality of interactive services 16 may be represented in interactive portion 56 of view 48 (FIGS. 1 and 2). For example, montage channel 38 may include a selected interactive service corresponding to a respective media segment, such as first interactive service 81 corresponding to first media segment 13, second interactive service 83 corresponding to second media segment 15, and nth interactive service 85 corresponding to nth media segment 17, where n is any positive integer. Alternatively or in addition, montage channel 38 may include one or more of the plurality of interactive services 16, where the selected one or more interactive services are based on user-defined preferences 58 (FIG. 1). Additionally, as noted above, in some aspects commentator audio data 34 may override the native audio data 88 of the given media segment 13, 15. For example, commentator audio data 34 comprising a "lead-in" may occur in a first time period 90 adjacent to and/or overlapping with a beginning of a second time period 92 corresponding to a length of a respective media segment 13, 15. Similarly, commentator audio data 34 comprising a "closing" may occur in a third time period 94 adjacent to and/or overlapping with an ending of second time period 92. It should be noted, however, that commentator audio data 34 may begin and end at any given time relative to a corresponding media segment.

Figure 6:
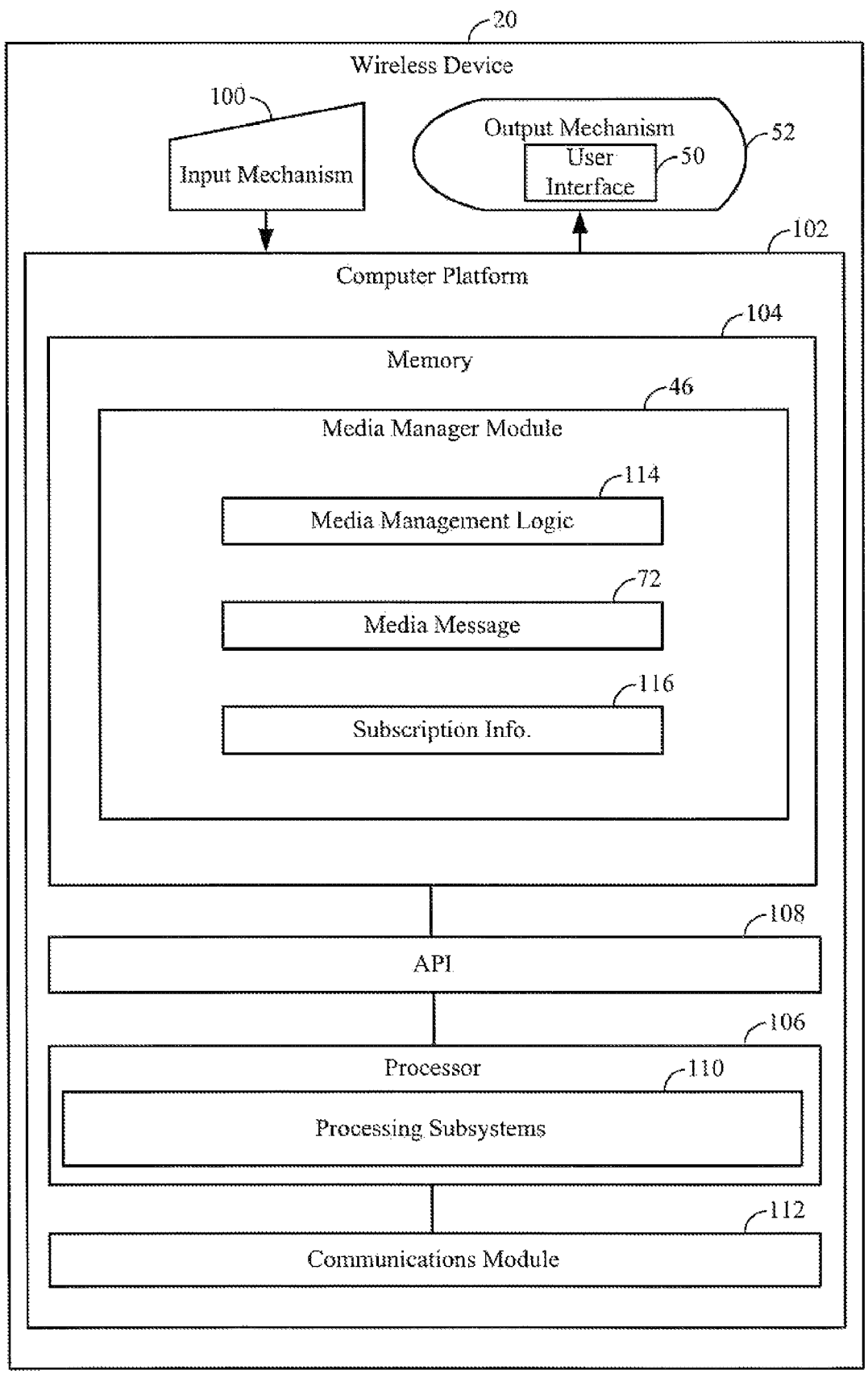
FIG. 6 is a schematic diagram of one aspect of an architecture of the wireless device of FIG. 1.

Referring to FIG. 6, in one aspect, wireless device 20 may include input mechanism 100 for generating inputs into wireless device, and output mechanism 52 for generating information for consumption by the user of the wireless device. For example, input mechanism 100 may include a mechanism such as a key or keyboard, a mouse, a touch-screen display, voice recognition module, etc. Further, for example, output mechanism 52 may include user interface 50, which may be a display, an audio speaker, a haptic feedback mechanism, etc.

Further, wireless device 20 has computer platform 102 that can transmit data across wireless network 42, and that can receive and execute software applications and display data transmitted from MDS 18 or another computer device connected to wireless network 42. Computer platform 102 includes a memory 104, which may comprise volatile and nonvolatile memory such as read-only memory (ROM) and/or random-access memory (RAM), electronically programmable ROM (EPROM), electronically erasable programmable ROM (EEPROM), flash cards or flash memory cells, magnetic media, optical media, tape, soft and/or hard disk, and any memory common to computer platforms. Further, memory 104 may include one or more of any secondary or tertiary storage device.

Further, computer platform 102 also includes a processor 106, which may be an application-specific integrated circuit (ASIC), or other chipset, logic circuit, or other data processing device. Processor 106 such as ASIC may execute air application programming interface (API) layer 108 that interfaces with any resident programs, such as a media manager module 46, in memory 104 of the wireless device. API 108 is a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processor 106 includes various processing subsystems 110 embodied in hardware, firmware, software, and combinations thereof, that enable the functionality of wireless device 20 and the operability of the wireless device on wireless access network 42. For example, processing subsystems 110 allow for initiating and maintaining communications, exchanging data, and executing multimedia presentations. In one aspect, such as in a cellular telephone, processor 106 may include one or a combination of processing subsystems 110, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® location-position (LPOS), position determination, position engine, user interface, sleep, data services, security, authentication, universal subscriber identity module (USIM), subscriber identity module (SIM), voice services, graphics, universal serial bus (USB), multimedia such as Movie Picture Experts Group (MPEG) standard files, etc. For the disclosed aspects, processing subsystems 110 of processing engine 108 may include any subsystem components that interact with applications executing on computer platform 102. For example, processing subsystems 110 may include any subsystem components which receive data reads and data writes from API 108 on behalf of media manager module 46.

Computer platform 102 may further include a communications module 112 embodied in hardware, firmware, software, and combinations thereof, that enables communications among the various components of the wireless device 20, as well as between wireless device 20 and wireless access network 42. For example, communications module 112 may include a transceiver module for wireless communications with MDS 18 and/or wireless access network 42.

Media manager module 46 operates to manage media subscription, media receipts, and media playing/viewing activities on wireless device 20. Media manager module 46 may include any hardware, software, firmware and/or other set of executable instructions operable to manage the media-related activities on wireless device 20. Further, media manager module 46 and/or memory 104 store media message 72 and its associated content information and the content for viewing/playing on user interface 50. In one aspect, media manager module 46 includes media management logic 114 that provides the capability to receive, store, provide access to and play/display media-related information on wireless device 20. For example, media management logic 114 operates to parse media message 72 and display view 48 of montage channel 38 on user interface 50 and/or generate any corresponding audio data. Similarly, in some aspects, media management logic 114 may operate to manage subscriptions to media packages with content retailers/providers, and to store the associated subscription information 116. For example, subscription information 116 may be any information, such as a content retailer identification, a package identification, encryption keys, etc., stored on device 20 relating to subscriptions to, or activations on, wireless networks and/or subscriptions to multimedia packages. Further, media management logic 114 operates to manage the acquisition and storage, including memory management functions, associated with a non real-time presentation, for example based on the respective contact window, as well as managing the playing/displaying of the content. Additionally, media management logic 114 operates with communications module 112 to receive and play real-time presentations and datacast presentations.

For example, in one non-limiting aspect, device 20 may subscribe to or be activated on wireless access network 42 (FIG. 1). Typically, an activation of device 20 onto network 42 enables the device to receive communications and/or multimedia services from at least one content retailer/provider. Further, this activation allows device 20 to receive a multicast including media message 72 (FIG. 1), even if the device is not subscribed to any packages. Because of being multicast, in one aspect, media message 72 includes all of the media content and information records defined by all of the content retailers. Further, in this case, media message 72 may include all of the content for a given schedule of programming, e.g. all of the base services and base service presentations and all of the auxiliary services and auxiliary presentations. In this example, upon receiving media message 72, media manager module 46 is operable to filter out all records and/or content not relevant to the device based on the content retailer associated with the device, and/or further based on the packages subscribed to by the device. In this manner, media manager module 46 may construct a retailer-specific, customized version of a media program guide, and/or a subscription menu, and further optimizes review of media message 72 by only addressing records and/or content relevant to the device.

Referring to FIG. 6, in some aspects, media distribution system (MDS) 18 may comprise one or any combination of any type of hardware, software, firmware, server, personal computer, mini computer, mainframe computer, and generally any special purpose and/or general purpose computing device. Further, there can be separate servers or computer devices and/or networks associated with MDS 18 that work in concert to receive, manipulate and provide data in usable formats to parties, and/or to provide a separate layer of control in the data flow between devices and networks and MDS 18.

MDS 18 may comprise a computer platform 101 comprising one or a plurality of resident and/or distributed computer platforms that can receive and transmit data, receive and execute software applications and generate and/or display data and/or content such as media presentations 14, base service 32 and/or auxiliary services 36. For example, computer platform 101 may be embodied in hardware, firmware, software, data, executable instructions and combinations thereof.

Computer platform 101 may be associated with an input mechanism 103 for generating inputs into MDS 18, and output mechanism 105 for generating information for consumption by a local and/or remote operator of MDS 22. For example, input mechanism 112 may include a mechanism such as a key or keyboard, a mouse, a touch-screen display, voice recognition module, etc. Further, for example, output mechanism 105 may be a display, an audio speaker, a haptic feedback mechanism, etc. Additionally, input mechanism 103 may be a remote device, such as a remote computer, dumb terminal and/or workstation, which has access to MDS 18. In some aspects, for example, input mechanism 103 and/or output mechanism 105 may be utilized by one or more operators to manage one or more of: the receipt media presentations from content providers; the establishment, maintenance and deletion of channels, tiers and packages associated with one or more content retailers and/or billing and customer service providers; the establishment, maintenance and deletion of subscription and billing information; and the distribution of content, such as montage channel 38, through media flows.

Further, computer platform 101 may include one or more data repositories and/or memories 107, which may comprise volatile and nonvolatile memory such as read-only and/or random-access memory (RAM and ROM), EPROM, EEPROM, flash cards, or any memory common to computer platforms. Further, memory 107 may include one or more flash memory cells, or may be any secondary or tertiary storage device, such as magnetic media, optical media, tape, or soft or hard disk, including removable memory mechanisms. In several aspects, for example, memory 107 includes the one or more content servers.

Further, computer platform 101 also includes a processor 109, which may be an application-specific integrated circuit (ASIC), or other chipset, logic circuit, or other data processing device for carrying out executable instructions.

Computer platform 101 may further include a communications module 111 embodied in one or more of hardware, firmware, software, data executable instructions and combinations thereof, that enables wired and wireless communications among the various components of MDS 18, and between MDS 18 and wireless device 20. For example, communications module 111 may include a transceiver module for wireless communications with wireless device 20.

Further, computer platform 101 may include one or more subscription/billing manager modules 113 which operate to manage all of the media content subscription and billing functions associated with MDS 18. For example, subscription/billing manager module 113 may be embodied in one or more of hardware, processors, software, firmware, data and/or other set of executable instructions. Further, in some aspects, subscription/billing manager module 113 includes subscription/billing management logic 115 that provides MDS 18 with the capability to receive, store and manipulate subscription and billing information 117, such as for each user or subscriber. For example, subscription/billing information 117 may include subscriber/device-user identity, address and payment-related information, corresponding wireless device identifier information, subscriber account information, package, tier, and channel information, etc. Further, subscription/billing management logic 115 may be operable to receive, process and transmit subscription related information, such as subscription requests, the corresponding approvals or denials, and the management of digital rights based on an approved subscription request for a channel, tier or package of content.

Additionally, computer platform 101 may include one or more distribution manager modules 119 which operate to manage all of the media content distribution functions associated with MDS 18. For example, distribution manager module 119 may be embodied in one or more of hardware, processors, software, firmware, data and/or other set of executable instructions. Further, in some aspects, distribution manager module 119 includes distribution management logic 121 that provides MDS 18 with the capability to receive, store and manipulate distribution information 123 and control the distribution of content. For example, distribution information 123 may include information and/or relative associations between information such as one or a combination of flows, flow regions, networks, content, channels, services, tiers, packages, content providers, content retailers, etc. Further, distribution management logic 121 may be operable to receive and process content, such as the plurality of media presentations 14, and content-related information, such as the plurality of interactive services 16, as well as content retailer-specific information, such as customization information, auxiliary services, auxiliary presentations, channel information, tier information and package information. Additionally, distribution management logic 121 may be operable to initiate the transmission of montage channel 38 to wireless device 20 via distribution mechanism 40. For example, in some aspects, distribution mechanism 40 may include a multicast mechanism. For example, a multicast mechanism may comprise all or some portion of a multicast system such as a Forward Link Only (FLO) network, including the MediaFLO™ System available from Qualcomm, Inc. of San Diego, Calif.

Additionally, computer platform 101 may include one or more content/channel manager modules 125 which operate to manage operations relating to the received media presentations, interactive services, commentator audio data, source decisions, etc. and the channels/services distributed by MDS 18. For example, content/channel manager module 125 may be embodied in one or more of hardware, processors, software, firmware, data and/or other set of executable instructions. Further, in some aspects, content/channel manager module 125 includes content/channel management logic 127 that provides MDS 18 with the capability to receive, optionally store and manipulate the plurality of media presentations 14 that define base service 38 based on source decision 30, the commentator audio data 34 optionally included with base service 38, the plurality of interactive services 16 that define auxiliary services 36 and any other information relating to montage channel 38 and/or any other channels distributed via MDS 18.

In some aspects, for example, content/channel management logic 127 is operable to generate one or more of a plurality of content and channel/service menus 129 suitable for interfacing with a user of MDS 18 to carry-out various content and channel/service management functions, such as channel/service definitions, defining montage channel 38, associating base services 32 with auxiliary services 36 etc.

Further, referring back to FIG. 1, wireless network 42 may comprise any communications network operable, at least in part, for enabling wireless communications between a respective wireless device 20 and any other device connected to wireless network 42. Further, wireless network 42 may include all network components, and all connected devices that form the network. For example, wireless network 42 may include at least one, or any combination, of: a cellular telephone network; a multicast network such as a Forward Link Only (FLO) network; a digital video broadcasting (DVB) network, such as DVB-S for satellite, DVB-C for cable, DVB-T for terrestrial television, DVB-H for terrestrial television for handhelds; a terrestrial telephone network; a satellite telephone network; an infrared network such as an Infrared Data Association ("IrDA")-based network; a short-range wireless network; a Bluetooth® technology network; a ZigBee® protocol network; an ultra wide band ("UWB") protocol network; a home radio frequency ("HomeRF") network; a shared wireless access protocol ("SWAP") network; a wideband network, such as a wireless Ethernet compatibility alliance ("WECA") network, a wireless fidelity alliance ("Wi-Fi Alliance") network, and any 802.xx network, where "xx" comprises a positive integer representing a give version or protocol; a public switched telephone network; a public heterogeneous communications network, such as the Internet; a private communications network; and land mobile radio network. Suitable examples of telephone networks include at least one, or any combination, of analog and digital networks/technologies, such as: code division multiple access ("CDMA"), wideband code division multiple access ("WCDMA"), universal mobile telecommunications system ("UMTS"), advanced mobile phone service ("AMPS"), time division multiple access ("TDMA"), frequency division multiple access ("FDMA"), orthogonal frequency division multiple access ("OFDMA"), global system for mobile communications ("GSM"), single carrier ("IX") radio transmission technology ("RTT"), evolution data only ("EV-DO") technology, general packet radio service ("GPRS"), enhanced data GSM environment ("EDGE"), high speed downlink data packet access ("HSPDA"), analog and digital satellite systems, and any other technologies/protocols that may be used in at least one of a wireless communications network and a data communications network.

Figure 7:
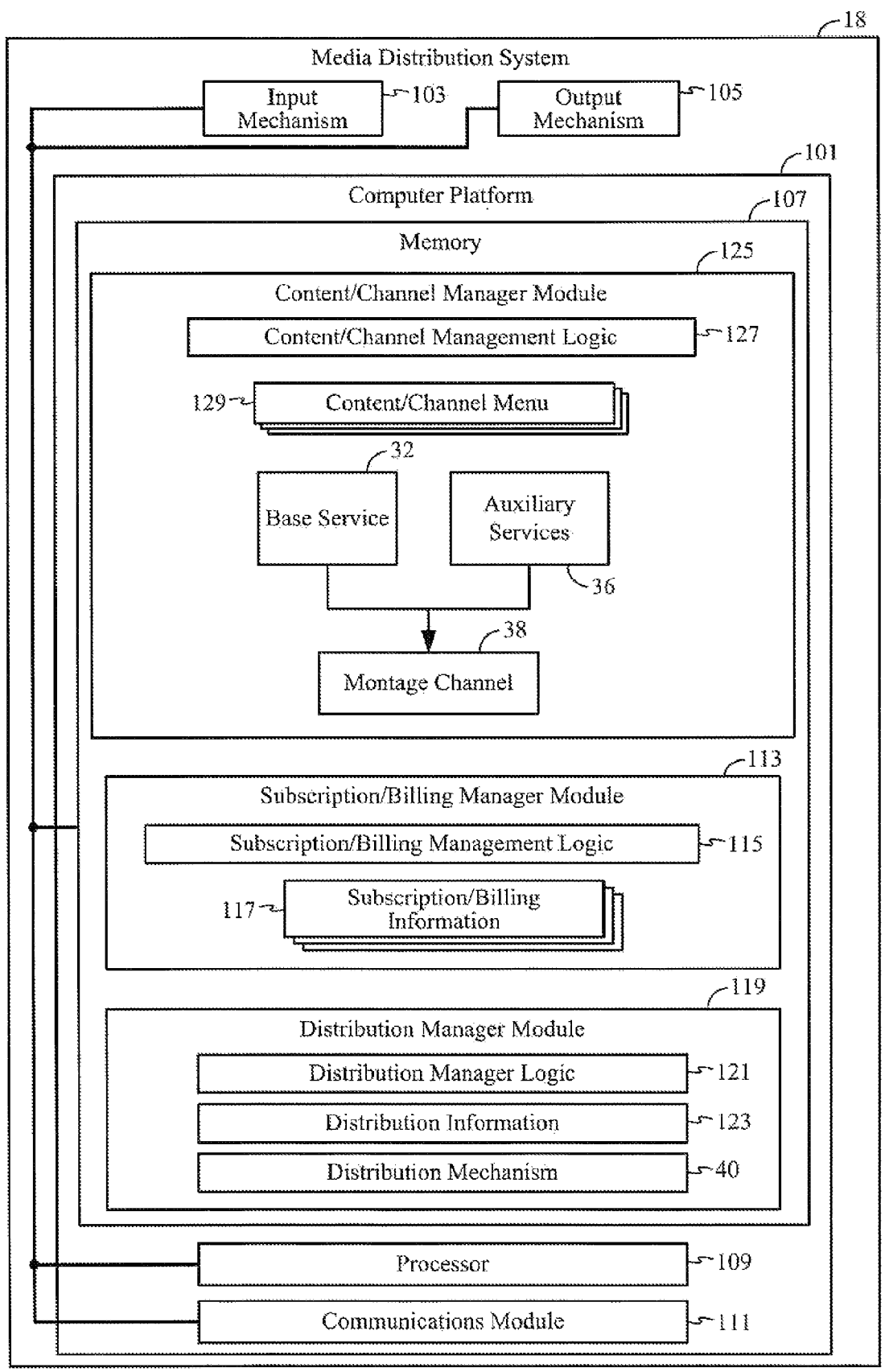
FIG. 7 is a schematic diagram of one aspect of an architecture of the media distribution system of FIG. 1.
Figure 8:
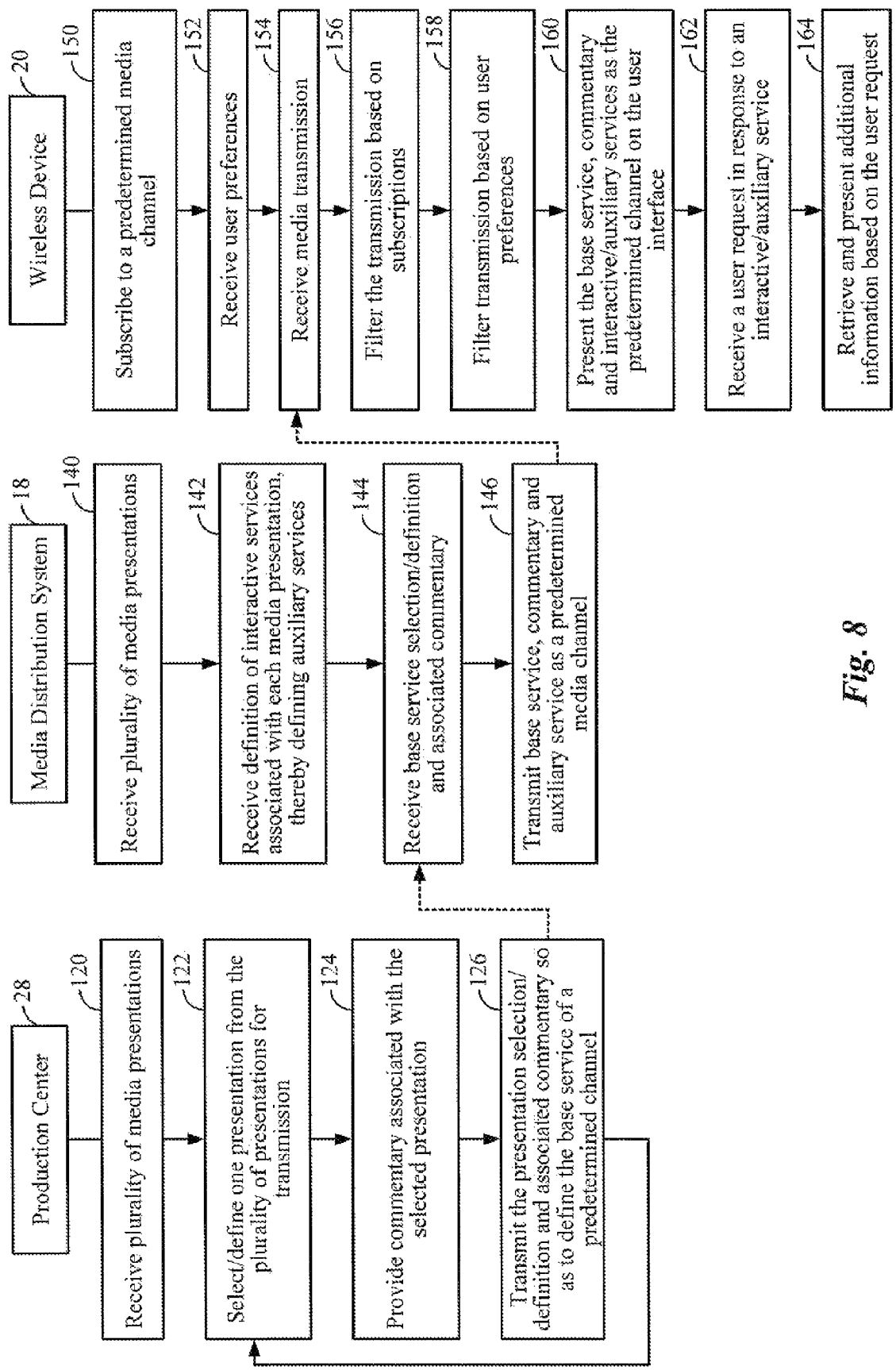
FIG. 8 is a flowchart of one aspect of methodology associated with the production, distribution, and presentation of a sequence of media segments and interactive services associated with the system of FIG. 1.

In operation, referring to FIG. 7, some aspects of a method of directing the production of content to distribute include receiving a plurality of media presentations (Block 120). For example, in some aspects, production center 28 receives and monitors plurality of media presentations 14 generated by one or more content providers 22. These media presentations may be real-time/live presentations, recorded presentations, and/or some combination of both. Further, for example, content providers 22 may be any entity capable of generating live and/or recorded media content.

Further, the method may include selecting/defining one from the plurality of media presentations for transmission (Block 122). This action may be desired when more content is available than outputs on which to distribute the content. For example, in some aspects, one or more monitoring mechanisms 26 tracking the plurality of media presentations 14 may identify a least a portion of a given presentation for transmission across the network. For example, the selected portion of the presentation, e.g. one of the at least two media segments 13, 15, may be any part of presentation 14. In some aspects, the selected media segment may be identified as being desirable to transmit to subscribers because the selected media segment includes a moment of interest. For example, the moment of interest may be a dramatic situation occurring in the presentation. In another example, such as in a sporting event, the moment of interest may be a non-game-deciding or non-outcome-determinative portion of the presentation in some aspects, while in other aspects the moment of interest may be a game-deciding or outcome-determinative portion of the presentation. For example, a non-game-deciding moment of interest may be based on a statistical performance characteristic associated with the given media segment, such as a batting average of a given baseball player against the pitcher who is pitching to him. It should be noted, however, that any statistical performance characteristic associated with a given event may be the subject of any given moment of interest. Further, in some aspects, one or more monitoring mechanisms 26, such as production assistants, may identify a plurality of media segments 13, 15 to a supervisor mechanism 80, such as a production supervisor, who may then select among them in order to make a source decision 30, which determines which media segment is transmitted, and/or who may make a number of sequential source decisions—switching between the various media segments in order to generate a base service 32 comprising a sequence 11 of at least two media segments 13, 15 from a plurality of presentations 14. In any case, in some aspects at least the beginning, and optionally the end, of a given media segment may be identified and defined, whereas in other aspects the entire segment may be identified and stored as a clip for later transmission.

Optionally, the method may include providing commentary audio data relating to the selected media presentation (Block 124). For example, in some aspects, supervisor mechanism 80 and/or some other entity associated with production center 28 may generate commentator audio data 34 to provide a lead-in and/or closing to respectively transition into and/or out of the given media segment. In some aspects, for example, commentator audio data 34 overrides, or is presented in place of, native audio data 88 associated with the selected media segment 13, 15. In some aspects, commentator audio data 34 is transmitted as it is generated, while in other aspects the commentator audio data is recorded and stored as a clip.

Further, the method may include transmitting the selection/definition of the media presentation, and/or the commentary, to a media distribution system so as to define a base service for a montage channel (Block 126). For example, in some aspects, transmitting the selected presentation/media segment may be effected by transmitting a source decision 30 to media distribution system 18, thereby designating a given presentation/media segment as the input to the base service being transmitted by the media distribution system. In this aspect, commentary audio data 34 may also be transmitted by production center 28 to media distribution system 18, and referenced to a given media presentation and/or source decision 30. In other aspects, the selected media presentation and/or commentary may be recorded and then transmitted to the media distribution system.

The method may then continue to operate by returning to Block 122 and running through the actions described above with regard to Blocks 122, 124 and 126.

Similarly, in some aspects, a method of distributing a media channel may comprise receiving a plurality of media presentations (Block 140). For example, in some aspects, media distribution system 18 may receive the plurality of media presentations 14 from one more content providers 22. The media presentations 14 and content providers 22 may be the same or similar to those discussed above with regard to Block 120.

The method may further include receiving a definition of interactive services associated with each of the plurality of media presentations (Block 142). For example, in some aspects, media distribution system 18 may receive auxiliary services 36, which comprise one or more of the plurality of interactive services 16, from one or more interactive content providers 24. The plurality of interactive services 16 may be references, such as identifiers or addresses, to sources of additional information or data associated with one or more of the plurality of media presentations 14. In other aspects, media distribution system 18 may receive content from the respective interactive service. For example, in some aspects, plurality of interactive services 16 may include universal resource location information, universal resource identification information, text files, graphic files, audio files, video files, datacast presentation, newswire services, and any other source of information. Further, in some aspects, one or more of the plurality of interactive services 16 may correspond to one or more of the plurality of media presentations 14, for example, by providing additional information relating to the given media presentation.

Further, the method may include receiving base service selection/definition and/or associated commentary (Block 144). For example, in some aspects, media distribution system 18 receives source decision 30 and/or selected media segment 13, 15 and/or commentator audio data 34 from production center 28, as described above with regard to Block 126.

Additionally, the method may include transmitting the base service, and/or commentary and/or auxiliary service as a predetermined channel (Block 146). For example, in some aspects, media distribution system 18 transmits montage channel 38 which comprises base service 32 and/or auxiliary services 36. The transmission may comprise a one-to-one transmission, such as a unicast, and/or a one-to-many transmission, such as a broadcast and/or a multicast. The transmission of montage channel 38 may be in the form of a media message 72 transmitted across wireless network 42. As noted above, base service 32 may comprise a sequence 11 of at least two media segments 13, 15 created by production center 28 through switching between the plurality of media presentations 14. Further, in some aspects, selected ones of the plurality of interactive services 16 associated with auxiliary services 36 may be matched to the respective media segment in the sequence 11 of media segments 13, 15.

In other aspects, a method of presenting distributed media may optionally include subscribing to a predetermined media channel (Block 150). For example, in some aspects, wireless device 20 may subscribe to a predetermined media channel, or to a media package comprising a plurality of channels of media offered by a content retailer. The predetermined channel, for example, may comprise montage channel 38 distributed by media distribution system 18.

Optionally, the method may include receiving user preferences relating to the output of media on the wireless device (Block 152). For example, in some aspects, wireless device 20 receives user-defined preferences 58 that define one or more output configurations of a given channel on the wireless device. These output configurations or modes may include user-defined preferences 58 relating to audio generated by output mechanism 52, and/of user-defined preferences 58 relating to a view 48 and an arrangement and/or content of an image portion 54 and an interactive portion 56 of the view.

Further, the method may include receiving a media transmission, including the predetermined channel (Block 154). For example, in some aspects, wireless device 20 receives media message 72 from media distribution system 18, where media message 72 includes montage channel 38 subscribed to by wireless device 20.

Additionally, the method may include filtering the media transmission based on a subscription and/or based on user preferences (Blocks 156 and 158). It should be noted that either of these filtering actions may be optional. For example, in some aspects, wireless device 20 receives media message 72, which may comprise a multicast message. In some aspects, a multicast message may include all possible content that can be subscribed to by a device, whereas the device is only authorized to access content to which the device is subscribed. For example, in some aspects, wireless device 20 include subscription information 116 that identifies subscribed content and/or channels, and media manager module 46 of wireless device 20 filters media message 72 based on subscription information 116 in order to determine accessible media content.

The method may further include presenting the base service, and/or commentary and/or interactive/auxiliary services as the predetermined channel on the user interface (Block 160). For example, in some aspects, media manager module 46 on wireless device 20 generates the accessible media from media message 72 on the output mechanism 52.

In the case of montage channel 38, media manager module 46 generates view 48 and corresponding audio associated with the sequence 11 of at least two media segments 13, 15 and commentary 34, while further generating the corresponding interactive portion 56 from the selected plurality of interactive services 16, e.g. auxiliary services 36, associated with montage channel 38 and/or the given media segment 13, 15 on montage channel 38

Optionally, the method may further include receiving a user request in response to an interactive/auxiliary service (Block 162). For example, in some aspects, a user of wireless device 20 may enter an input into input mechanism 100 in response to one of the plurality of interactive services 16 presented on interactive portion 56 and/or in the Options menu 70. For example, the user request may comprise a request for additional information relating to the given media segment 13, 15 presented on image portion 54.

Further, the method may include retrieving and presenting additional information in response to the user request (Block 164). For example, in some aspects, media manager module 46 may retrieve content stored within media message 72 as identified by the given auxiliary service 36 and/or interactive service 16. In other aspects, the given the auxiliary service 36 and/or interactive service 16 may include reference or link to a source of the additional information, with a link or source may be associated with a network device across a wireless network. In such a case, media manager module 46 is operable to exchange communications across a wireless network to retrieve the additional information from the given or source. In some aspects, the additional information may be retrieved from media distribution system 18, while in other aspects additional information may be retrieved from other networked devices. The retrieved information may be presented, for example, in interactive portion 56 of view 48, or in any other manner as may be configured.

Thus, the described aspects provide a montage channel comprising a sequence of at least two media segments. In some aspects, montage channel may further combine the media segments with interactive services that provide additional information, for example, which may be associated with the current one of the media segments being presented. Further, the montage channel may include commentary audio data, for example, that provides a transition into and/or out of a given media segment, or that provides commentary at any point within the given media segment. For example, montage channel may be advantageously provided in a scenario where a predetermined number of inputs of media content are available, but where a number of outputs available for distributing the media content are less than the predetermined number of media inputs.

In one non-limiting example, a given number of sporting events may be available to media distribution system for transmission to subscribers. The media distribution system, however, may have less than the given number of channels available or allocatable, based on a decision of a content retailer, on which to transmit the sporting events. For example, in a situation where more than one of the sporting events occurs at the same time and only one channel is available or allocated for carrying the sporting events, a production center may monitor the concurrent sporting events and switch between them in order to generate a montage channel comprising a sequence of media segments from selected portions of the plurality of sporting events. On a wireless device operable to receive the montage channel, the user experiences the sequence of media segments in an image portion of an output mechanism. Further, in some aspects, the user may experience the sequence of media segments in the image portion while also experiencing interactive services corresponding to the image on an interactive portion of the output mechanism.

It should be understood, however, that distributing sporting events is one of a plurality of possible scenarios, and any other type of event and/or presentation and/or media may be distributed through montage channel 38.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the foregoing disclosure illustrates selected aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

What is claimed is:

1. A method of distributing a media channel, comprising:
   receiving a sequence of media segments from selected portions of at least two corresponding media presentations, wherein the at least two media presentations include at least two real-time, substantially simultaneously-occurring events;
   receiving at least one interactive service associated with each of the selected media segments;
   generating a channel comprising a base service, including audio and video content, and an auxiliary service;
   generating a commentary and transmitting the commentary to the base service, wherein the commentary overrides audio content associated with the selected media segments to provide a transition from a first media segment of the selected media segments and a transition into a second media segment of the selected media segments; and
   transmitting the channel to one or more wireless devices, wherein the channel includes additional audio content that overrides at least one of the commentary that provides the transition from the first media segment and the commentary that provides the transition into the second media segment, and wherein the additional audio content is different from the commentary that provides the transition from the first media segment and the commentary that provides the transition into the second media segment,
   wherein the base service comprises the sequence of selected media segments from the at least two media presentations, and wherein the auxiliary service comprises the at least one interactive service associated with each of the selected media segments, the at least one interactive service including:
   a player roster related to the corresponding media presentation, a player transaction display for at least one team in the corresponding media presentation, a scoreboard providing a game score related to the corresponding media presentation, a player injury display for at least one team in the corresponding media presentation, audio data that supplants the audio content included in the base service, or team statistics for at least one team in the corresponding media presentation, or any combination thereof;
   wherein the at least one interactive service content is configured to be reproduced via a receiving device and the video content of the base service is configured to be reproduced by the receiving device.

2. The method of claim 1, wherein the auxiliary service comprises at least one of a universal resource locator, an Internet Protocol address, a datacast service, a text file, a graphics file, an audio file, and a video file.

3. The method of claim 1, wherein the auxiliary service comprises at least one of a secondary audio service, and a secondary video service.

4. The method of claim 1, further comprising receiving from a wireless device a user request based on the auxiliary service, and transmitting additional information to the wireless device based on the user request.

5. The method of claim 1, wherein transmitting the channel further comprises transmitting each one of the sequence of selected media segments substantially in real-time.

6. The method of claim 1, wherein receiving a sequence of selected media segments further comprises receiving at least one real-time media segment and at least one non-real-time media segment, and wherein transmitting the channel further comprises transmitting the sequence of selected media segments including the real-time media segment and the non real-time media segment.

7. The method of claim 1, further comprising determining each of the selected media segments based on a moment of interest occurring in each of the simultaneously-occurring events.

8. A wireless device operable to receive and display the channel distributed according to the method of claim 1.

9. An apparatus comprising:
   at least one processor; and
   a memory storing instructions that, when executed by the at least one processor, cause the at least one processor to perform operations including:
   receiving a sequence of media segments from selected portions of at least two corresponding media presentations, including at least two real-time, substantially simultaneously-occurring events;

receiving at least one interactive service associated with each of the selected media segments;

generating a channel comprising a base service, including audio and video content, and an auxiliary service, generating a commentary and transmitting the commentary to the base service, wherein the commentary overrides audio content associated with the selected media segments to provide a transition from a first media segment of the selected media segments and a transition into a second media segment of the selected media segments; and transmitting the channel to one or more wireless devices, wherein the channel includes additional audio content that overrides at least one of the commentary that provides the transition from the first media segment and the commentary that provides the transition into the second media segment, and wherein the additional audio content is different from the commentary that provides the transition from the first media segment and the commentary that provides the transition into the second media segment wherein the base service comprises the sequence of selected media segments from the at least two media presentations, and wherein the auxiliary service comprises the at least one interactive service associated with each of the selected media segments, the at least one interactive service including:
   a player roster related to the corresponding media presentation, a player transaction display for at least one team in the corresponding media presentation, a scoreboard providing a game score related to the corresponding media presentation, a player injury display for at least one team in the corresponding media presentation, audio data that supplants the audio content included in the base service, or team statistics for at least one team in the corresponding media presentation, or any combination thereof;

wherein the at least one interactive service content is configured to be reproduced via a receiving device and the video content of the base service is configured to be reproduced by the receiving device.

10. The apparatus of claim 9, wherein the auxiliary service comprises at least one of a universal resource locator, an Internet Protocol address, a datacast service, a text file, a graphics file, an audio file, and a video file.

11. The apparatus of claim 9, wherein the auxiliary service comprises at least one of a secondary audio service, and a secondary video service.

12. The apparatus of claim 9, wherein the operations include receiving from a wireless device a user request based on the auxiliary service, and transmitting additional information to the wireless device based on the user request.

13. The apparatus of claim 9, wherein transmitting the channel further comprises transmitting each one of the sequence of selected media segments substantially in real-time.

14. The apparatus of claim 9, wherein receiving a sequence of selected media segments further comprises receiving at least one real-time media segment and at least one non-real-time media segment, and wherein transmitting the channel further comprises transmitting the sequence of selected media segments including the real-time media segment and the non real-time media segment.

15. The apparatus of claim 9, wherein the operations include determining each of the selected media segments based on a moment of interest occurring in each of the simultaneously-occurring events.

16. A wireless device operable to receive and display the channel distributed by the apparatus of claim 9.

17. A computer program product, comprising:
   a non-transitory computer-readable storage medium comprising:
      a first set of codes configured to cause a computer to receive a sequence of media segments from selected portions of at least two corresponding media presentations, including at least two real-time, substantially simultaneously-occurring events;
      a second set of codes configured to cause the computer to receive at least one interactive service associated with each of the selected media segments;
      a third set of codes configured to cause the computer to generate a channel comprising a base service, including audio and video content, and an auxiliary service;
      a fourth set of codes configured to cause the computer to generate a commentary and to transmit the commentary to the base service, wherein the commentary overrides audio content associated with the selected media segments to provide a transition from a first media segment of the selected media segments and a transition into a second media segment of the selected media segments; and
      a fifth set of codes configured to cause the computer to transmit the channel to one or more wireless devices, wherein the channel includes additional audio content that overrides at least one of the commentary that provides the transition from the first media segment and the commentary that provides the transition into the second media segment, and wherein the additional audio content is different from the commentary that provides the transition from the first media segment and the commentary that provides the transition into the second media segment
   wherein the base service comprises the sequence of selected media segments from the at least two media presentations, and wherein the auxiliary service comprises the at least one interactive service associated with each of the selected media segments,
   the at least one interactive service including:
      a player roster related to the corresponding media presentation, a player transaction display for at least one team in the corresponding media presentation, a scoreboard providing a game score related to the corresponding media presentation, a player injury display for at least one team in the corresponding media presentation, audio data that supplants the audio content included in the base service, or team statistics for at least one team in the corresponding media presentation, or any combination thereof;
   wherein the at least one interactive service content is configured to be reproduced via a receiving device and the video content of the base service is configured to be reproduced by the receiving device.

18. The computer program product of claim 17, wherein the auxiliary service comprises at least one of a universal resource locator, an Internet Protocol address, a datacast service, a text file, a graphics file, an audio file, and a video file.

19. The computer program product of claim 17, wherein the auxiliary service comprises at least one of a secondary audio service, and a secondary video service.

20. The computer program product of claim 17, further comprising at least one code configured to cause the computer to receive from a wireless device a user request based on the auxiliary service, and transmitting additional information to the wireless device based on the user request.

21. The computer program product of claim 17, wherein the fourth set of codes is configured to cause the computer to transmit each one of the sequence of selected media segments substantially in real-time.

22. The computer program product of claim 17, wherein the first set of codes is configured to cause the computer to receive at least one real-time media segment and at least one non-real-time media segment, and wherein the fourth set of codes is configured to cause the computer to transmit the sequence of selected media segments including the real-time media segment and the non real-time media segment.

23. The computer program product of claim 17, further comprising at least one code configured to cause the computer to determine each of the selected media segments based on a moment of interest occurring in each of the simultaneously-occurring events.

24. The computer program product of claim 17, further comprising at least one set of codes operable by a wireless device to receive and display the channel.

25. A media distribution system, comprising:
means for receiving a sequence of media segments from selected portions of at least two corresponding media presentations, including at least two real-time, substantially simultaneously-occurring events;
means for receiving at least one interactive service associated with each of the selected media segments;
means for generating a channel comprising a base service, including audio and video content, and an auxiliary service,
means for generating a commentary and transmitting the commentary to the base service, wherein the commentary overrides audio content associated with the selected media segments to provide a transition from a first media segment of the selected media segments and a transition into a second media segment of the selected media segments; and
means for transmitting the channel to one or more wireless devices, wherein the channel includes additional audio content that overrides at least one of the commentary that provides the transition from the first media segment and the commentary that provides the transition into the second media segment, and wherein the additional audio content is different from the commentary that provides the transition from the first media segment and the commentary that provides the transition into the second media segment
wherein the base service comprises the sequence of selected media segments from the at least two of the plurality of media presentations, and wherein the auxiliary service comprises the at least one interactive service associated with each of the selected media segments,
the at least one interactive service including a player roster related to the corresponding media presentation, a player transaction display for at least one team in the corresponding media presentation, a scoreboard providing a game score related to the corresponding media presentation, a player injury display for at least one team in the corresponding media presentation, audio data that supplants the audio content included in the base service, or team statistics for at least one team in the corresponding media presentation, or any combination thereof;
wherein the at least one interactive service content is configured to be reproduced via a receiving device and the video content of the base service is configured to be reproduced by the receiving device.

26. A wireless device operable to receive and display the channel distributed according to the media distribution system of claim 25.

27. The media distribution system of claim 25, wherein the auxiliary service comprises at least one of a universal resource locator, an Internet Protocol address, a datacast service, a text file, a graphics file, an audio file, and a video file.

28. The media distribution system of claim 25, wherein the auxiliary service comprises at least one of a secondary audio service, and a secondary video service.

29. The media distribution system of claim 25, further comprising a means for receiving from a wireless device a user request based on the auxiliary service, and a means for transmitting additional information to the wireless device based on the user request.

30. The media distribution system of claim 25, wherein the means for transmitting is configured to transmit each one of the sequence of selected media segments substantially in real-time.

31. The media distribution system of claim 25, wherein the means for receiving is configured to receive at least one real-time media segment and at least one non-real-time media segment, and wherein the means for transmitting is configured to transmit the sequence of selected media segments including the real-time media segment and the non real-time media segment.

32. The media distribution system of claim 25, the media distribution system further comprising a means for determining each of the selected media segments based on a moment of interest occurring in each of the simultaneously-occurring events.

33. A media distribution device, comprising:
a communications module operable to receive a sequence of media segments from selected portions of at least two corresponding media presentations, wherein the communications module is further operable to receive at least one interactive service associated with the of media presentations,
a manager module operable to define a channel comprising a base service, including audio and video content, and an auxiliary service, wherein the base service comprises the sequence of selected media segments, and wherein the auxiliary service comprises at least one interactive service associated with each of the at least two media presentations in the sequence of selected media segments,
a production module operable to generate a commentary and transmit the commentary to the base service, wherein the commentary overrides audio content associated with the selected media segments to provide a transition from a first media segment of the selected media segments and a transition into a second media segment of the selected media segments,
the at least one interactive service including a player roster related to the corresponding media presentation, a player transaction display for at least one team in the corresponding media presentation, a scoreboard providing a game score related to the corresponding media presentation, a player injury display for at least one team in the corresponding media presentation, audio data that supplants the audio content included in the base service, or team statistics for at least one team in the corresponding media presentation, or any combination thereof;

wherein the at least one interactive service content is configured to be reproduced via a receiving device and the video content of the base service is configured to be reproduced by the receiving device; and a distribution manager module comprising a distribution mechanism operable to transmit the channel to one or more wireless devices, wherein the channel includes additional audio content that overrides at least one of the commentary that provides the transition from the first media segment and the commentary that provides the transition into the second media segment, and wherein the additional audio content is different from the commentary that provides the transition from the first media segment and the commentary that provides the transition into the second media segment.

34. The media distribution device of claim 33, wherein the auxiliary service comprises at least one of a universal resource locator, an Internet Protocol address, a datacast service, a text file, a graphics file, an audio file, and a video file.

35. The media distribution device of claim 33, wherein the auxiliary service comprises at least one of a secondary audio service, and a secondary video service.

36. The media distribution device of claim 33, further comprising at least one module operable to cause the computer to receive from a wireless device a user request based on the auxiliary service, and transmitting additional information to the wireless device based on the user request.

37. The media distribution device of claim 33, wherein the distribution mechanism is operable to transmit each one of the sequence of selected media segments substantially in real-time.

38. The media distribution device of claim 33, wherein the first communications module is operable to cause the computer to receive at least one real-time media segment and at least one non-real-time media segment, and wherein the distribution mechanism is operable to transmit the sequence of selected media segments including the real-time media segment and the non real-time media segment.

39. The media distribution device of claim 33, further comprising at least one module operable to determine each of the selected media segments based on a moment of interest occurring in each of the simultaneously-occurring events.

40. A wireless device operable to receive and display the channel distributed by the media distribution device of claim 33.

41. A method of distributing a media channel, comprising:

receiving a sequence of media segments from selected portions of at least two corresponding media presentations, including at least two real-time, substantially simultaneously-occurring events;

receiving at least one interactive service associated with each of the selected media segments;

generating a montage channel comprising a base service, including audio and video content, and an auxiliary service and a commentator audio channel, wherein the base service comprises the sequence of selected media segments from the at least two of the plurality of media presentations, wherein the auxiliary service comprises the at least one interactive service associated with each of the selected media segments, and wherein the commentator audio channel is configured to provide commentator audio data that overrides audio content associated with the selected media segments to provide a transition from a first media segment of the selected media segments and a transition into a second media segment of the selected media segments; and transmitting the media montage channel to one or more wireless devices, wherein the media montage channel includes additional audio content that overrides at least one of the commentator audio data that provides the transition from the first media segment and the commentator audio data that provides the transition into the second media segment, and wherein the additional audio content is different from the commentator audio data that provides the transition from the first media segment and the commentator audio data that provides the transition into the second media segment.

* * * * *